United States Patent [19]

Chao et al.

[11] Patent Number: 4,908,702
[45] Date of Patent: Mar. 13, 1990

[54] REAL-TIME IMAGE DIFFERENCE DETECTION USING A POLARIZATION ROTATION SPACIAL LIGHT MODULATOR

[75] Inventors: Tien-Hsin Chao, Valencia; Hua-Kuang Liu, South Pasadena, both of Calif.

[73] Assignee: The United States of America as represented by the Administrator of the National Aeronautics and Space Administration, Washington, D.C.

[21] Appl. No.: 187,716

[22] Filed: Apr. 29, 1988

[51] Int. Cl.$^4$ ............................................... H04N 7/18
[52] U.S. Cl. ...................... 358/93; 358/106; 382/31; 340/716; 350/337; 350/347 E; 353/20
[58] Field of Search ................. 358/93, 106, 88, 89, 358/91, 92, 90, 101, 76; 350/400, 401, 334, 347 R, 335; 356/392, 393, 394; 340/716, 784, 795; 353/20, 30, 122, 8; 382/30, 31

[56] References Cited

U.S. PATENT DOCUMENTS

| | | |
|---|---|---|
| 3,389,056 | 6/1975 | Mayer, Jr. et al. |
| 3,787,117 | 1/1974 | Watkins ............................... 353/20 |
| 4,330,712 | 5/1982 | Yoshida . |
| 4,458,993 | 7/1984 | Kempf . |
| 4,476,465 | 10/1984 | Anderson ......................... 340/716 X |
| 4,513,441 | 4/1985 | Henshaw . |
| 4,542,404 | 9/1985 | Duschl . |
| 4,612,666 | 9/1986 | King . |
| 4,637,056 | 1/1987 | Sherman et al. . |
| 4,648,053 | 3/1987 | Fridge . |
| 4,653,867 | 3/1987 | Urabe et al. . |
| 4,663,670 | 5/1987 | Ito et al. . |
| 4,680,627 | 7/1987 | Sase et al. . |
| 4,692,943 | 9/1987 | Pietzsch et al. . |
| 4,770,500 | 9/1988 | Kalmanash et al. ............ 350/347 E |
| 4,772,101 | 9/1988 | Liu ..................................... 382/31 X |

OTHER PUBLICATIONS

"Real-Time Optical Interferometric Image Subtraction by Wave Polarization", Zhao et al; *Applied Optics*, vol. 4, #21, Nov. '82.
"Application of Inexpensive LC TV to Optical Parallel Logic"; SPIE vol. 825, *Spatial Light Modulators and Applications;* Yu et al; 1987; pp. 163–168.
"Real-Time LC TV XOR and XNOR-Gate Binary Image Subtraction Technique", *Applied Optics*, vol. 26, #14, Jul. '87, Yu et al.

*Primary Examiner*—James J. Groody
*Assistant Examiner*—Victor R. Kostak
*Attorney, Agent, or Firm*—Thomas H. Jones; John R. Manning; Charles E. B. Glenn

[57] ABSTRACT

An image difference detection system is described, of the type wherein two created image representations such as transparencies representing the images to be compared lie coplanar, while light passes through the two transparencies and is formed into coincident images at the image plane for comparison. The two transparencies are formed by portions of a polarization rotation spacial light modulator display such as a multi-pixel liquid crystal display or a magneto optical rotation type. In a system where light passing through the two transparencies is polarized in transverse directions to enable the use of a Wollaston prism to bring the images into coincidence, a liquid crystal display can be used which is devoid of polarizing sheets that would interfere with transverse polarizing of the light passing through the two transparencies.

10 Claims, 2 Drawing Sheets

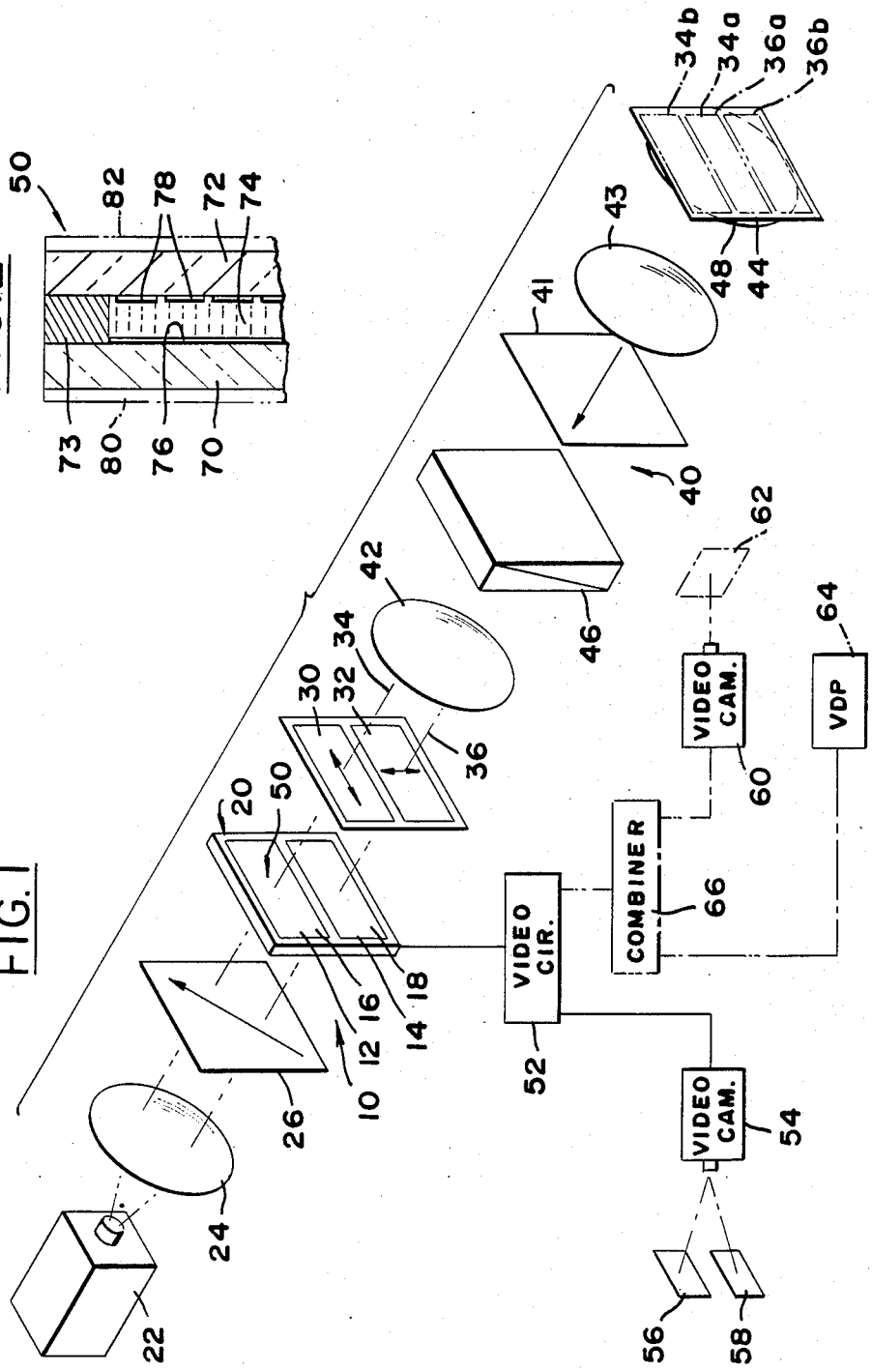

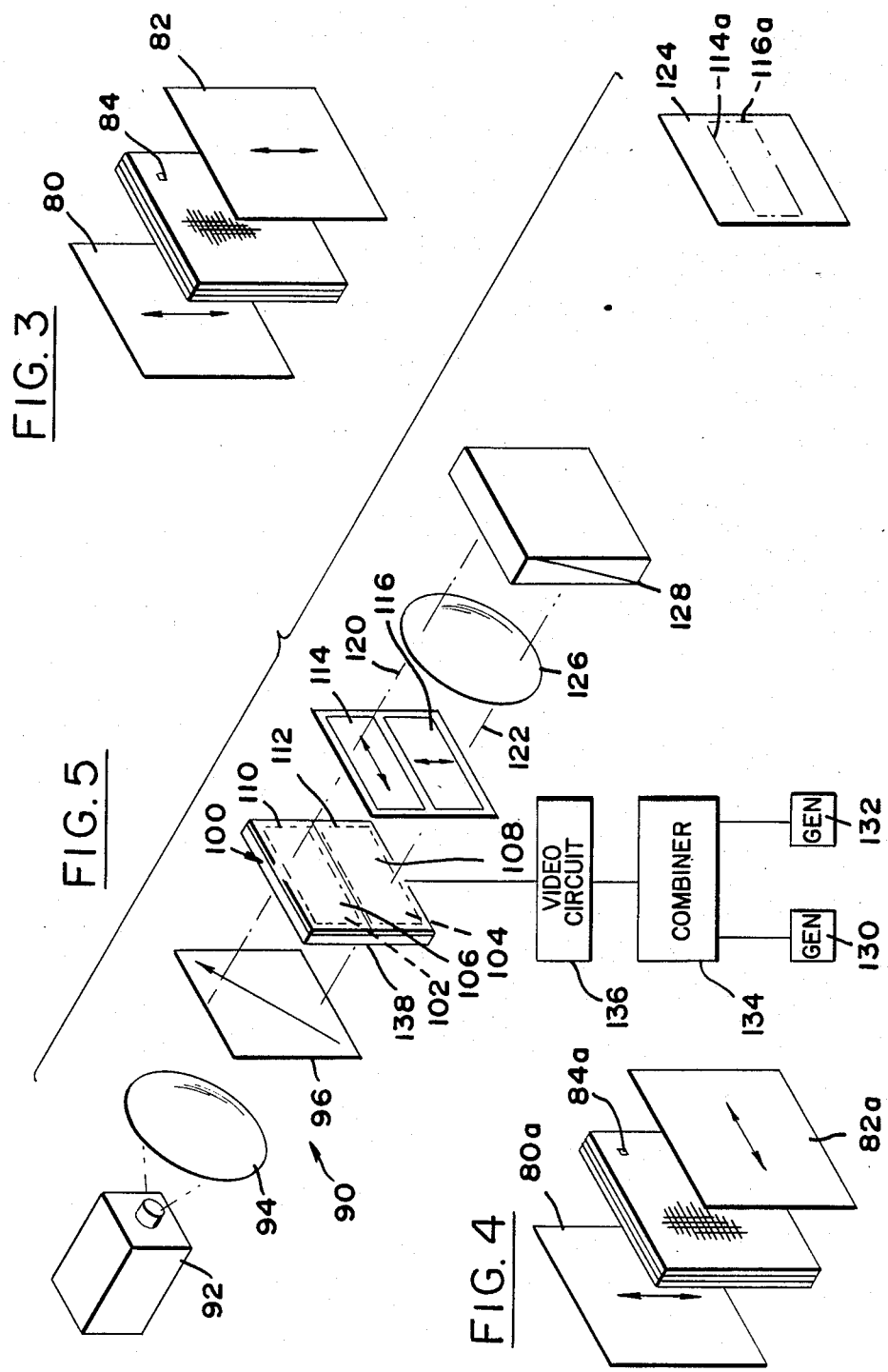

REAL-TIME IMAGE DIFFERENCE DETECTION USING A POLARIZATION ROTATION SPACIAL LIGHT MODULATOR

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

This invention relates to optical processors, and to image difference detectors of the type wherein the images are represented by two transparencies which are to be compared.

BACKGROUND ART

One type of image difference detector includes means for holding two created image representations, such as transparencies formed by photographs taken on slide film, so they are coplanar. Collimated light passes through the two transparencies and the light is focused as images at an image plane. The images are made coincident at the image plane by polarizing the light passing through the two images in transverse directions and passing the light through a Wollaston prism that forms coincident images. The Wollaston prism employs the polarizations to direct the images into coincidence. The polarization also results in a 180° phase difference between the images. An analyzer can sense locations where the two coincident images do not cancel, to thereby sense areas of the images which are not coincident. A modified form of the image difference detector employs different color filters in line with the transparencies, such as green and red filters, to create coincident images at the image plane where the image is yellow except at areas where the images are not identical (where they are red or green).

Devices for creating image representations such as transparencies representing the images being compared, which could generate the image representations in real time and at low cost, would facilitate the production of real-time optical processing devices.

STATEMENT OF THE INVENTION

In accordance with one embodiment of the present invention, a difference detecting apparatus is provided which includes a relatively low cost apparatus for producing created image representations such as transparencies in real time. The apparatus includes at least one display having coplanar but spaced portions that each includes multiple individually addressable pixels whose polarization rotation can be controlled. A pair of video signal generators is provided such as a camera which can view an actual object or a video recording, and means are provided for controlling the image on each display portion according to the output of the video generator. Where light passing through the two images is to be polarized in transverse directions for interference difference detection, the transparencies can be formed as portions of a single liquid crystal display. An available television liquid crystal or magneto rotation display monitor can be used, but with the polarization sheets removed.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of an image difference detection apparatus constructed in accordance with one embodiment of the present invention.

FIG. 2 is a sectional view of a portion of the image display device of FIG. 1, and indicating how it can be obtained from a liquid crystal television monitor.

FIG. 3 is an exploded perspective view of one embodiment of a display of the type indicated in FIG. 2, including a prior art polarization sheet arrangement.

FIG. 4 is an exploded perspective view of another type of display device of the type indicated in FIG. 2, including another prior art polarization sheet arrangement.

FIG. 5 is perspective view of an image difference detection apparatus constructed in accordance with another embodiment of the invention.

DETAILED DESCRIPTION OF THE INVENTION

FIG. 1 illustrates a system 10 for detecting the difference between two images 12, 14 defined by created image representations formed by transparencies 16, 18 of an image display device 20. Coherent light such as from a laser 22 is collimated by a lens 24 and passes through a polarizer 26 whose polarization orientation is as indicated by the arrow thereon. Where the light is randomly polarized, the polarizer 26 is not necessary. The light passes through both transparencies 16, 18 of the image display device and through first and second polarizing filters 30, 32. The polarizing directions of the filters are as indicated, with the first 30 being oriented so its polarization orientation is horizontal and the second 32 oriented so its polarization direction is vertical. The light passing through the filters 30, 32 includes a first processed image-representing light beam 34 which includes horizontally polarized light representing the transparency image 12, and a second processed image-representing light beam 36 which includes vertically polarized light representing the second image 14.

An apparatus 40 responsive to the polarizations of the light beams 34, 36 indicates their differences. Basically, the apparatus 40 includes a polarizer 41 with its polarizing direction as indicated, which forms images of the transparency-representing images 12, 14 onto a common plane 44, with the images being coincident. The different directions of polarization of the light beams 34, 36 results in their being 180° out of phase, so that identical portions of the two images interfere to cancel out one another. The only light left at the image plane includes light from portions of the images that are not identical. The apparatus 40 includes an imaging or focusing lens 42 which forms images of the transparencies at the image plane 44. A Wollaston prism 46, which can be formed of two pieces of birefringent material such as Calcite but of different indexes of refraction, splits each light beam into two diverging components, the directions of divergence depending on the direction of polarization of light beams. Thus, the light beam 34 is split into two portions forming images at 34a, 34b, while the other light beam 36 is split into two image portions 36a, 36b. The prism is located so that two of the image portions 34a, 36a of the two light beams are coincident at the image plane. A rotatable analyzer 48 can be positioned to detect the degree of correspondence of the images.

The above-described portion of the system 10 has been known but difficult to implement. A major difficulty is generating the created image representations such as the transparencies 16, 18 representing the images to be compared, so the transparencies can be created in real time. Applicant forms the image display device 20 so it includes a display 50 having multiple pixels that produce a controlled polarization rotation of light passing therethrough. The display is controlled by a video circuit 52 which receives signals from at least one video signal generator 54. In one example, the display is the monitor of a liquid crystal television which has been modified as described below. The generator 54 is a video camera that views two objects 56, 58 and passes corresponding video signals to the video circuit 52 which drives the liquid crystal display 50. In another example, two generators are used, one being a video camera 60 which views an object 62 and another generator includes a record means such as a video disk player 64 which forms a record means that stores and plays back a video image. A combiner 66 combines the video outputs of the two generators 60, 64 to produce a single video output representing a screen display containing the two images represented by the two generator outputs, but with the two images occupying different portions of the video display. Thus, in the liquid crystal display 50, one of the images 12 occupies an upper portion of the display while the other image 14 occupies a lower portion of the display.

Liquid crystal displays and video circuitry for driving them are available in low cost monochromatic television sets, except that such displays cannot be used without modification. FIG. 2 illustrates a portion of the liquid crystal display 50. It includes a pair of plates or sheets 70, 72 with a separator 73 and a layer of liquid crystal material 74 between them. One of the sheets 70 has numerous parallel vertical conductors 76 thereon, while the other sheet has numerous horizontal conductors 78. Each location in the liquid crystal layer 74 where a pair of conductors 76, 78 cross defines a pixel wherein the electric field can be controlled. When there is no electric field, the liquid crystal material rotates the angle of polarization of light passing therethrough by 90°. When the electric field approaches a saturated level the polarization of light passing therethrough is not affected. Electric fields between zero and saturation cause a corresponding amount of rotation of polarization of light passing therethrough. It may be noted that for high speed operation, as required in a television set, the rotation angle may vary within a limited range such as between 79° and 90°, but the range of rotation can be considerably increased where lower speed operation is acceptable.

When used as a television monitor, the display of a television set includes a pair of additional sheets 80, 82 of polarizing material. FIG. 3 illustrates one arrangement where such sheets 80, 82 have parallel directions of polarization. The first sheet 80 lets through primarily vertically polarized light. If there is a zero electric field at one of the pixels such as 84, then the vertically polarized light is rotated 90°. The second polarizer sheet 82 will then block all light. On the other hand, if the electric field of the pixel 84 rotates the light by only 80°, then about 10% of the light will pass through the second sheet 82. In another television monitor arrangement shown in FIG. 4, the polarizing sheet 80a, 82a are oriented in perpendicular directions. The first sheet 80a lets through vertically polarized light which may be rotated 90° by one of the pixels 84a if there is no electrical field thereat. This will allow all of the light to pass through the second polarizer 82a. If there is an electrical field at the pixel 84a which causes rotation of the light by only 80°, then perhaps only 90% of the light will pass through the second polarizer 82a.

If the television monitors of FIGS. 3 or 4 were used with their polarizer sheet in place, then they would not be suitable for the system 10 of FIG. 1, because at least one of the processed light beams 34 or 36 would have all of its light blocked. Applicant is able to use an available low cost liquid crystal display television monitor, by removing the polarizing sheets 80, 82 which are generally attached to the outer surfaces of the plates or sheets 70, 72 that contain the liquid crystal material.

Applicant prefers to use a single liquid crystal display 50 (FIG. 1) with the two transparencies occupying different portions of the display. This assures that both of the transparencies 16, 18 will lie precisely coplanar. If the two transparencies were not precisely coplanar, then it would be more difficult to produce precisely coincident images at the image plane, which would detract from the comparison of the images.

While a liquid crystal display of the type described above can be used, it should be noted that other types of real time SLM (spacial light modulators) can be used instead. Any such type of SLM will include multiple individually addressable pixels which control the polarization orientation of light passing through them. For example, the Hughes LCLV (Liquid Crystal Light Valve) Spacial Light Modulator sold by the Hughes Aircraft Company may be used. In that SLM the modulation on the input side may be controlled by light from a conventional TV monitor. The light from the monitor controls photoconductors at the SLM pixels. These pixels control the polarization of light reflected from the output side. Light may be considered to pass through such a display by passage through the monitor screen to the LCTV and reflection therefrom. Another example is the SIGHT-MOD. sold by The SEMETEX Corporation of Torrence, Calif., which has pixels of the magneto optical Faraday rotation type. The pixels are addressed by crossed electrodes carrying currents that control the magnetic, field at each pisel. The magnetic field can change the orientation of polarization of input light at the pixels and the pixels therefore represent the created image representation. In the LCLV case, reflection rather than transmission is used so that a Schlering system with a cubic beamsplitter is required at the location of the display device at 50.

FIG. 5 illustrates another system 90 which relies upon difference in color rather than cancelling of light by interference, for the comparison of images. The system includes a light source 92 which preferably emits white light, and which does not need coherence in any of the color components of the light. A lens 94 Collimates the light. A polarizer 96 with its direction of polarization as indicated, is used where the light is not randomly polarized. The light passes through an image display device 100 which forms a pair of images 102, 104 by a pair of transparencies 106, 108 having areas of differing degrees of transparencies. In addition, a green filter 110 lies over the first transparency 106 while a red filter 112 lies over the second transparency 108. The light from each transparency then passes through one of a pair of polarizing filters 114, 116 respectively polarized horizontally and vertically. A pair of processed image-representing light beams 120, 122 emerge after passing through the transparencies, color filters, and polarizers. These light beams are used to form coincident images of the transparency images 102, 104 on an image plane 124. This is accomplished by an imaging lens 126 and a Wollaston prism 128 in the same manner as for the system of FIG. 1. However, an analyzer is not used here, but instead a person or sensor views the coincident images 114a, 116a at the image plane. Where there are identical image portions, the overlapping green and red light results in a yellow color. Where there is a difference, the corresponding portions of the image are green or red.

In the system of FIG. 5, the different polarization of the light beams 120, 122 is used to enable the production of precisely coincident images, using an optical setup that is relatively stable. However, it is possible to use other optical systems to form images of the same size and that are both sharply in focus at an image plane, and that are precisely coincident at that image plane. However, such optical systems generally direct each light beam through a different set of optical elements, and it is difficult to hold such elements in precise position and orientation relative to each other.

The system described above for FIG. 5 is known. However, as with the system of FIG. 1, it has been difficult to generate two transparencies representing the two images to be compared, in real time. Applicant uses an image display device 100 of the same type as described above for the image device 20 of FIG. 1. For example, the image device 100 can be formed by a liquid crystal display which includes a pair of plates or sheets having generally perpendicular electrical conductors thereon and trapping liquid crystal material between them. A liquid crystal display of a television set can be used by removing the polarizing sheets at its opposite faces, which results in a display devoid of a pair of polarization sheets that each covers substantially the entire display, which have polarization directions that are parallel or perpendicular to one another. At least one and preferably two video generators 130, 132 generate video signals representing a pair of images, the output of the generators passing through a combiner 134 and a video circuit 136 to the liquid crystal display 138 of the image display device. The use of a single liquid crystal display 138 facilitates the forming of two coincident images 114a, 116a that are both in focus at the image plane.

Thus, the invention provides apparatus for detecting the difference between two images, of the type that employs two created image representations such as in the form of transparencies and means for combining the images to be compared, which facilitates the generation of the images in real time. This is accomplished by using a display having multiple rows and columns of individually addressable pixels, and by the use of a video generating means which generates video signals representing two images to be compared and which controls the polarization of the pixels (in the presence of an external polarizing sheet) of the display. The display can be a liquid crystal display of a monochromatic television monitor wherein all pixels can affect the rotation of polarization, but the pixels do not individually filter out certain colors of light more that other pixels.

Although particular embodiments of the invention have been described and illustrated herein, it is recognized that modifications and variations may readily occur to those skilled in the art and consequently it is intended to cover such modifications and equivalents.

We claim:

1. Apparatus for detecting the difference between two images, comprising:
    an image display device which includes two created image representations to be compared lying coplanar but spaced from each other, each representation defining an image to be compared;
    means for passing light through said two representations;
    a first polarizing filter which has a polarization oriented in a first direction, said first filter positioned to pass light which passes through said first representation, to produce a first processed image-representing light beam;
    a second filter which has a polarization oriented in a second direction transverse to said first direction, said second filter positioned to pass light which passes through said second representation, to produce a second processed image-representing light beam;
    means responsive to the polarizations of said first and second image-processed light, for indicating differences in the images defined by said transparencies;
    said image display device comprising at least one display that includes first and second portions, each portion including a multiplicity of rows and columns of individually addressable display pixels whose polarization rotation angle is controllable, video signal generator means for generating signals representing two video images, and means for controlling the pixels in each of said portions according to the output of said generator to represent one of said video images.

2. The apparatus described in claim 1 wherein:
    said image display device includes a single liquid crystal array, and said means for controlling includes means for displaying the images represented by said generator signals in spaced regions of said liquid crystal display.

3. The apparatus described in claim 1 wherein:
    said generator means includes a video camera for viewing an object whose image is to be compared, and record means for storing and playing back a video image representing the other image to be compared.

4. The apparatus described in claim 1 wherein:
    said display includes a display device of a liquid crystal television set monitor, but which is devoid of polarizing sheets.

5. Apparatus for detecting the difference between two images, comprising:
    an image display device which includes two transparencies to be compared, each transparency defining an image to be compared;
    means for forming an image plane;
    first directing means for passing light through said first transparency and forming a first image of said first transparency onto said image plane, wherein said first image includes primarily light of a first color;
    second directing means for passing light through said second transparency and forming a second image of said second transparency onto said image plane coincident with said first image, wherein said second image includes primarily light of a second color different from said first color, whereby differences in said first and second images appear as regions of distinctive colors;

said image display device including at least one monochromatic display that includes first and second portions, each portion having a multiplicity of individually addressable pixels, and circuitry for controlling the transparency of each of said pixels, video signal generator means for generating signals representing first and second video images, and means for controlling the transparency of the pixels in each of said portions according to the video signals representing one of said video images.

6. The apparatus described in claim 5 wherein:

said first and second directing means includes first and second polarizer sheets lying respectively in line with said first and second transparencies and having polarizations oriented in perpendicular directions, and light diverting means including a Wollaston prism and a focusing lens positioned in line with both said first and second transparencies and polarizer sheets for directing light which passes through each transparency and corresponding polarizer sheet into coincident images on said image plane;

said image display device being devoid of an additional polarizer in line with both of said transparencies and having an orientation perpendicular to either of said polarizer sheets.

7. The apparatus described in claim 5 wherein: said image display device includes a single liquid crystal array, and said means for controlling includes combining means for displaying the images represented by said generator signals in spaced regions of said liquid crystal display.

8. The apparatus described in claim 5 wherein:

said generator means includes a first generator that includes a video camera for viewing an object whose image is to be compared, and a second generator that includes record means for storing and playing back a video image representing the other image to be compared.

9. The apparatus described in claim 5 wherein:

said display device includes a display of a liquid crystal television set, which has only one polarizing sheet.

10. In an image difference detection apparatus which includes means for passing light through two coplanar but spaced transparencies that each represent a transparency image to be compared and means for forming coincident images of the two transparency images onto an image plane with said light, where the light that passes through the two transparencies is being polarized in substantially transverse directions and the image forming means deflects the light according to its polarization to bring said images into coincidence, the improvement wherein:

said two transparencies each includes spaced portions of a single monochromatic liquid crystal display which is devoid of polarizing sheets.

* * * * *